(12) United States Patent
Eichhorn et al.

(10) Patent No.: US 8,774,477 B2
(45) Date of Patent: *Jul. 8, 2014

(54) SYSTEM AND METHOD TO DETERMINE SLIDE QUALITY OF A DIGITIZED MICROSCOPE SLIDE

(71) Applicant: Leica Biosystems Imaging, Inc., Vista, CA (US)

(72) Inventors: Ole Eichhorn, Westlake, CA (US); Cindy Perz, Vista, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/060,534

(22) Filed: Oct. 22, 2013

(65) Prior Publication Data

US 2014/0044327 A1     Feb. 13, 2014

Related U.S. Application Data

(63) Continuation of application No. 13/515,073, filed as application No. PCT/US2011/039173 on Jun. 3, 2011, now Pat. No. 8,565,503.

(60) Provisional application No. 61/396,971, filed on Jun. 4, 2010.

(51) Int. Cl.
*G06K 9/00* (2006.01)
*G21K 7/00* (2006.01)

(52) U.S. Cl.
USPC ............................. 382/128; 382/274; 378/43

(58) Field of Classification Search
CPC ................................ G02B 21/03; G21K 7/00
USPC ......... 382/100, 103, 106, 108, 128–134, 162, 382/268, 173, 178–181, 199, 219, 232, 254, 382/274–276, 287–294, 305, 312; 378/43, 378/20
See application file for complete search history.

(56) References Cited

U.S. PATENT DOCUMENTS

| | | | |
|---|---|---|---|
| 7,668,362 B2 * | 2/2010 | Olson et al. | 382/133 |
| 7,925,069 B2 * | 4/2011 | Ortyn et al. | 382/133 |
| 2002/0114497 A1 * | 8/2002 | Wetzel et al. | 382/128 |
| 2009/0074284 A1 * | 3/2009 | Zeineh et al. | 382/133 |
| 2010/0111396 A1 * | 5/2010 | Boucheron | 382/133 |

* cited by examiner

*Primary Examiner* — Seyed Azarian
(74) *Attorney, Agent, or Firm* — Pattric J. Rawlins; Procopio, Cory, Hargreaves & Savitch LLP

(57) ABSTRACT

Systems and methods for assessing the quality of a digital slide image. In an embodiment, the digital slide image is divided into a plurality of image regions. For each of a subset of the plurality of image regions, a quality of the image region is determined based on a determined spatial frequency of the image region. In addition, a visual depiction of the digital slide image may be generated that, for each of the subset of the plurality of image regions, indicates the determined quality of that image region.

20 Claims, 9 Drawing Sheets

SYSTEM AND METHOD TO DETERMINE SLIDE QUALITY OF A DIGITIZED MICROSCOPE SLIDE

RELATED APPLICATION

The present application is a continuation of U.S. patent application Ser. No. 13/515,073, filed on Jun. 11, 2012 and issued as U.S. Pat. No. 8,565,503 on Oct. 22, 2013, which is the U.S. national stage of International App. No. PCT/US2011/039173, filed on Jun. 3, 2011, which claims priority to U.S. Provisional Patent App. No. 61/396,971, filed on Jun. 4, 2010, all of which are hereby incorporated herein by reference in their entireties.

BACKGROUND

1. Field of the Invention

The present invention relates to the field of digital pathology and more particularly relates to the assessment of image quality based on complexity and spatial frequencies and the presentation of said assessment using both visual and quantitative results.

2. Related Art

The cornerstone of pathology is the glass microscope slide with its biologic specimen. Traditionally, a pathologist used a conventional microscope to inspect the specimen. The pathologist would navigate the field of view by moving the slide underneath the microscope's lens and increase or decrease the field of view by selecting lenses of different magnifications. To adjust for the variable thickness of a specimen, the pathologist would adjust the focus by moving the optics up and down and modify the brightness by adjusting the light aperture. In this manner, the pathologist interactively adjusts for acceptable image quality.

Similarly, the cornerstone of digital pathology is the digitized microscope slide ("digital slide"), an image file of the entire slide. Digital pathology scans the microscope glass slide at a high magnification, automating the pathologist's actions of focus and dynamic range adjustment as it captures the image and stores the digital slide. The pathologist inspects the digital slide using viewing software. It is critical that the image is scanned without fault because the viewing software simply displays the captured digital slide and cannot re-focus the image or offer dynamic range adjustments. Common problems that plague scanning software include, but are not limited to, out of focus scans and the introduction of scan-hardware related artifacts into images.

Manually reviewing each image for sufficient scan quality is time consuming because a given digital slide image may be very large (e.g., as large as 200K×100K pixels). Additionally, in many cases only an expert may be able to properly judge variations in the quality of a digital slide and these judgments are highly subjective. For example, scan artifacts can make distinct sub-cellular structures apparent in one slide region but difficult to distinguish in a nearby region. Scan artifacts can also change tissue architecture from a crisply patterned texture to a smooth plane. Furthermore, even a properly scanned digital slide may lack sufficient quality for proper analysis and review. Accordingly, there exists a need for a system that is capable of measuring the quality of the digital slide image and identifying scan-related artifacts.

SUMMARY

Determination of image quality is a difficult task for a computer system, whereas an expert may readily distinguish between a good quality image and a bad quality image. Particularly, an expert may judge the content and context of an image and see differences in focus and contrast. However, research shows that no single metric stands out as the dominant indicator of image quality for a wide variety of imagery. Instead, combinations of metrics in classification schemes prove themselves more reliable indicators yet have not been proven to operate well in digital pathology.

In digital pathology, the imagery is limited to biologic specimens. The look of a specimen is complex and its nature varies from patient to patient. However, areas of interest in most specimens are generally "busy" areas of activity with respect to tissue and cell structures, as illustrated in FIG. 6. These "busy" areas of activity translate mathematically into the presence of spatial frequencies. The digital slide quality determination system and method use the spatial frequencies that are present in a high quality pathology image. By determining the presence of certain spatial frequencies in the image, the system generates a quantifiable assessment of the digital slide image quality.

By analyzing the images based on complexity and spatial frequencies, an example embodiment described herein provides visual feedback on the quality of the whole slide by overlaying the image in the viewing software with a color coded "heat map" of local area quality. Thus, the user is presented with both an absolute quality measure for the whole image and the ability to see the quality variability of local areas at a glance.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide systems and methods for assessment of image quality based on complexity and spatial frequencies and the presentation of said assessment using both visual and quantitative results. For example, one method disclosed herein allows for analyzing digital slide images based on complexity and spatial frequencies to provide visual feedback on the quality of the whole slide by overlaying the image in the viewing software with a color coded "heat map" of local area quality and thereby provide the user with both an absolute quality measure for the whole image and the ability to see the quality variability of local areas at a glance. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 7:
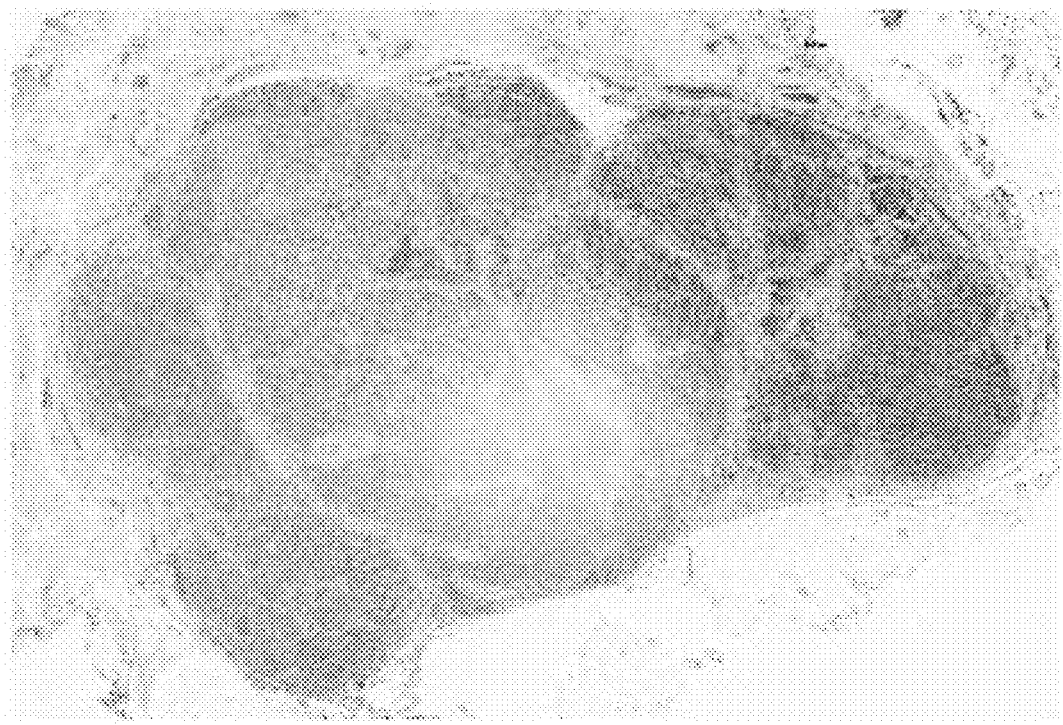
FIG. 7 illustrates an example embodiment of a digital slide.

Since digital slide content is diverse, as illustrated in FIG. 7, measuring the spatial frequencies of the whole image would not characterize the image quality well. Pathology imagery contains considerable white space, fragmented specimens of no import, and cover slip edges and air bubbles. An expert reviewing a given image intuitively ignores these issues and does not consider them material to the image quality. Therefore, the present system similarly discounts them.

Figure 14:
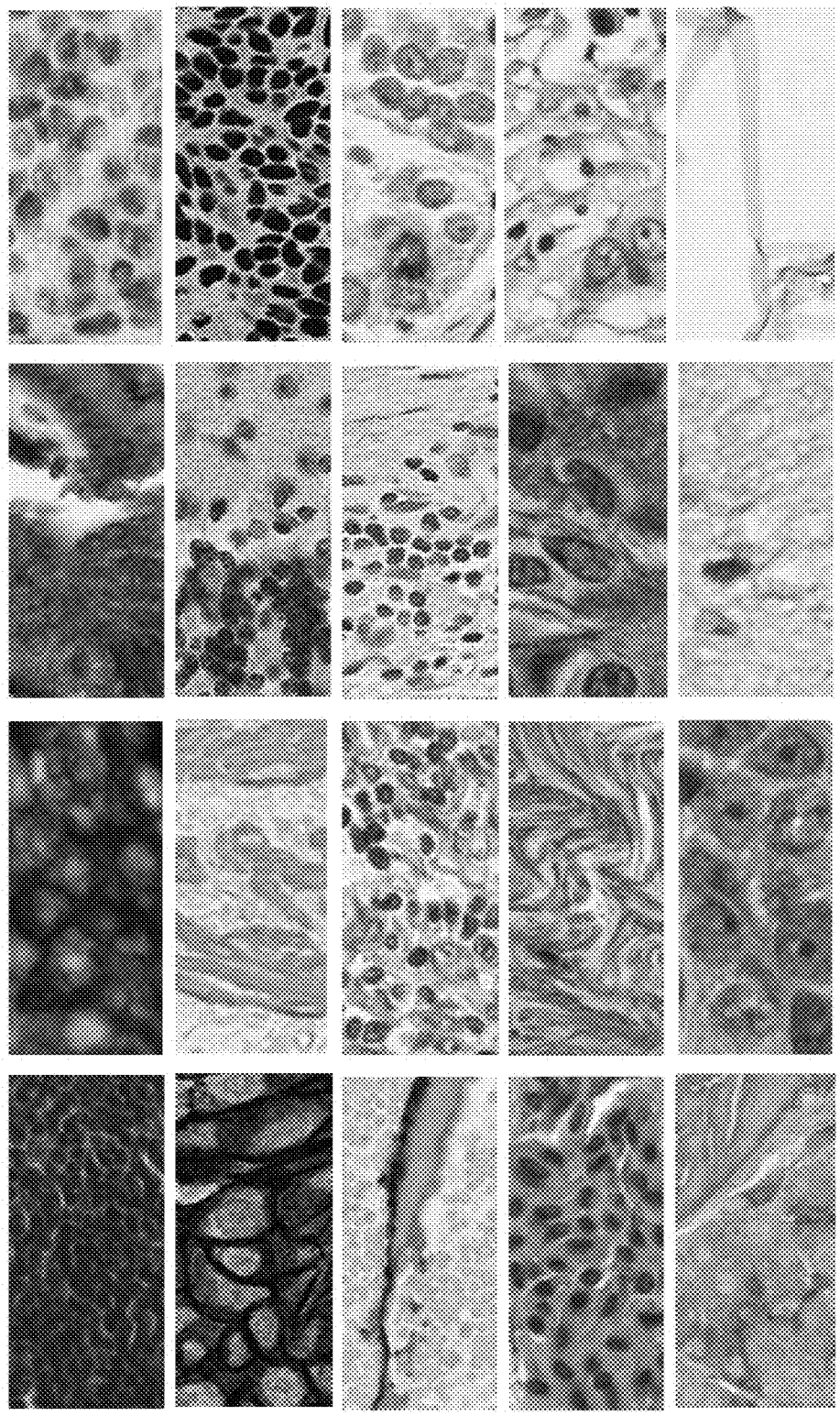
FIG. 14 illustrates examples of different variations in digital slide content.

FIG. 14 illustrates examples of different variations in digital slide content that result from protocol differences, stain kit selection, and pathologist staining preferences. Biologic samples present extraordinary differences between patients, pathology and organs resulting in image variations. Slide preparation also varies the digital slide content by producing tissue folds, adding foreign matter, microtome blade chatter and different sample thicknesses.

The digital slide capture process is conducted at a wide range of resolutions. Additionally the digital slide capture process may employ various image compression techniques (e.g. JPEG, JPEG2000), each of which may have settings uniquely tailored to establish a desired compression quality.

In order to tolerate the variability of a given specimen, the example embodiment of the slide quality determination system executes a two-part analysis: a micro-analysis process followed by a macro-analysis process.

Micro-Analysis

Figure 1:
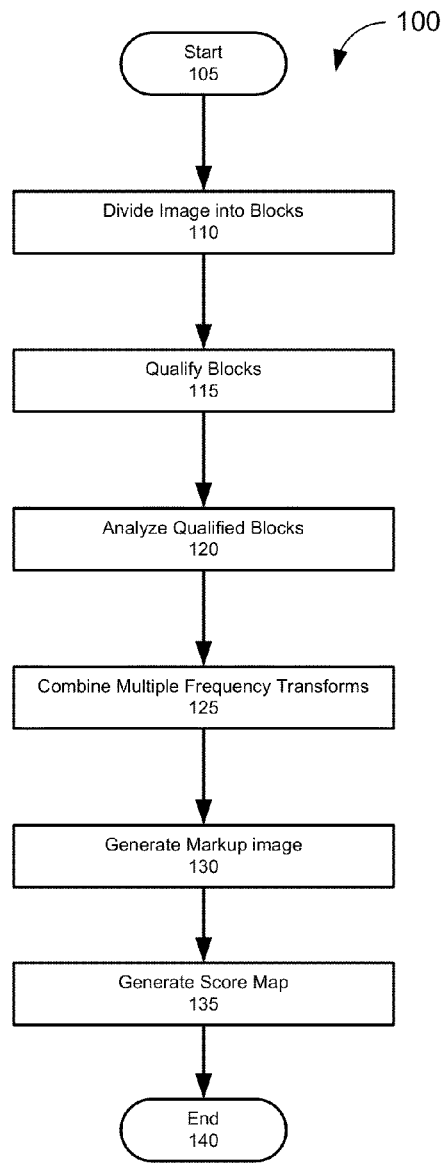
FIG. 1 is a schematic flow diagram illustrating one embodiment of a micro-analysis process.

The micro-analysis process evaluates the whole image by breaking it down into small parts (referred to herein as "regions or blocks") and performing quality analysis on each of those parts. FIG. 1 illustrates an example embodiment of a micro-analysis process 100 performed by a slide analysis system in accordance with the present invention.

Micro-Analysis process 100 begins at step 105.

At step 110, process 100 may evaluate the image as a grid of small images called blocks or regions. The size of a given block may be dependent upon the resolution of the image. For example, a block may be large enough to contain one or more cells. Empirically, a block size may be an n×n block with edge lengths in the range of 32-96 pixels, such as for example, 32, 64, or 96 pixels. However, various embodiments may exist with pixel squares having dimensions greater than 96 pixels or less than 32 pixels. Furthermore, the blocks are not limited to squares but may include various other shapes capable of making up an image slide, including, but not limited to, rectangular blocks, stripes, polygonal regions, circular regions, etc.

At step 115, process 100 may qualify each block. The qualification step serves to determine which blocks have proper specimen content. For example, a block containing too much white space may be classified as "background", or a block that is too dark or light may be classified as "not-processed". Further metrics may determine whether a block contains sufficient edge activity, contrast, etc.

At step 120, qualified blocks may be analyzed with frequency transforms. This may include analyzing the blocks' spatial frequency content. The analysis may include performing a two dimensional Fast Fourier Transform ("FFT"), Discrete Fourier Transform ("DFT"), Discrete Cosine Transform ("DCT") or Discrete Sine Transform ("DST"). The present example embodiment is illustrated using a DCT. However, the use of DCT in the present example is not intended to illustrate a preference of bias towards or against the use of DCT, or any other viable single or combination of frequency transforms.

At step 120, a plurality of DCTs may be performed in a grid pattern over the blocks. An overlapping pattern could also be performed in which case modified-DCT ("MDCT") is performed. DCTs within an image block may be referred to as "partial-DCTs."

Figure 2A:
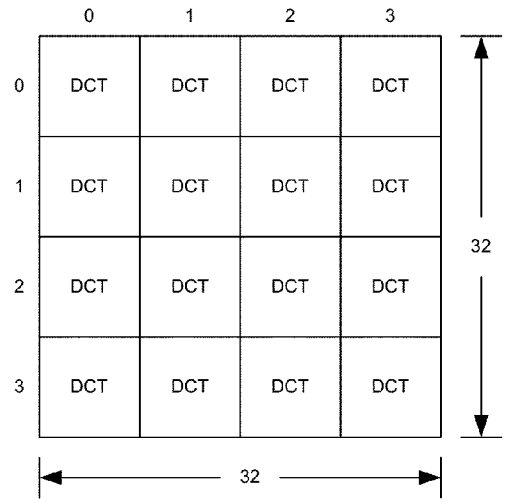
FIG. 2A is an example embodiment of 8×8 frequency transforms applied to a 32×32 pixel image block.
Figure 2B:
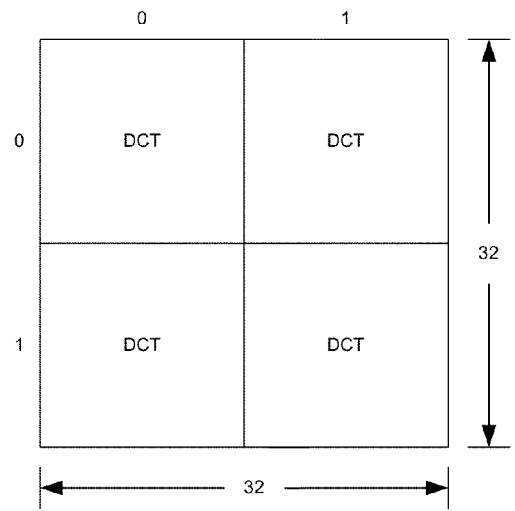
FIG. 2B is an example embodiment of 16×16 frequency transforms applied to 32×32 pixel image block.

In the example embodiment, the partial-DCT size may be set such that at least 4 partial-DCTs may fit within an image block. For example, a 32×32 pixel image block can use an 8×8 or 16×16 partial-DCT. FIG. 2A illustrates an example embodiment with 8×8 partial-DCTs in a 32×32 pixel image block. FIG. 2B illustrates a second example embodiment with a 16×16 partial-DCTs in a 32×32 pixel image block.

At step 125, process 100 may combine the multiple frequency transforms into a Block Score. Process 100 may consolidate the partial-DCTs into a "block-DCT." The block-DCT may have the same two dimensional size of the block. During the consolidation, partial-DCTs with values that are above a given threshold may contribute to the corresponding block-DCT. The amount each partial-DCT contributes to the block-DCT may be based on the magnitude of the partial-DCT. Alternatively, each partial-DCT may contribute a preset uniform value, such that the block-DCT may become a count value for the number of partial-DCTs in the block that exceeded a predetermined threshold.

A quality score for the block may be generated from the block-DCT. The block-DCT may be required to meet a minimum magnitude to indicate the presence of a frequency. For example, the ratio of partial-DCTs above a threshold forming the block-DCT may be representative of the amount of frequency content in the image block. This value may be determined by dividing the number of partial-DCTs above a threshold forming the block-DCT by the number of partial-DCTs making up the block. Alternatively each partial-DCT may be weighted to emphasize the contributions of one frequency range; for example, the higher frequencies could be weighted more than the lower frequencies. The weighted sum of the partial-DCTs of a given frequency may then be normalized by the sum of the weights to produce a value between 0 and 1.

Multiplying the value by 100 provides a score from 0 to 100. A score of 70 may indicate that 70% of the possible spatial frequencies were present. An excellent quality image block may score in the 80's or 90's. An acceptable quality block may score in the 60's or 70's. A poor quality image block may score in the 50's or below. Table 1 illustrates an example numeric block score range that can serve to score the different blocks.

TABLE 1

| Block Score | Score Description | Markup Image Color |
|---|---|---|
| 100-85 | Excellent | Blue |
| 84-75 | Good | Green |
| 74-65 | Decent | Yellow |
| 64-55 | Low | Orange |
| 54-0 | Poor | Red |

At step 125, process 100 may generate a markup image from the qualified blocks. The markup image, also known as an overlay image, may be generated by blending each block's original image converted to gray scale with a block of color related to the block's score. Any scheme could be devised, such as, for example, the color coding scheme presented in Table 1.

Figure 11:
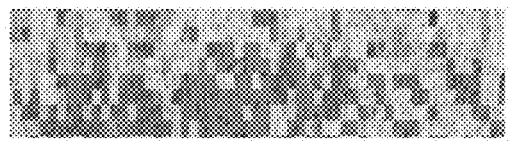
FIG. 11 illustrates an example of a high resolution cut out of the markup image displaying an edge effect from scanning.
Figure 8:
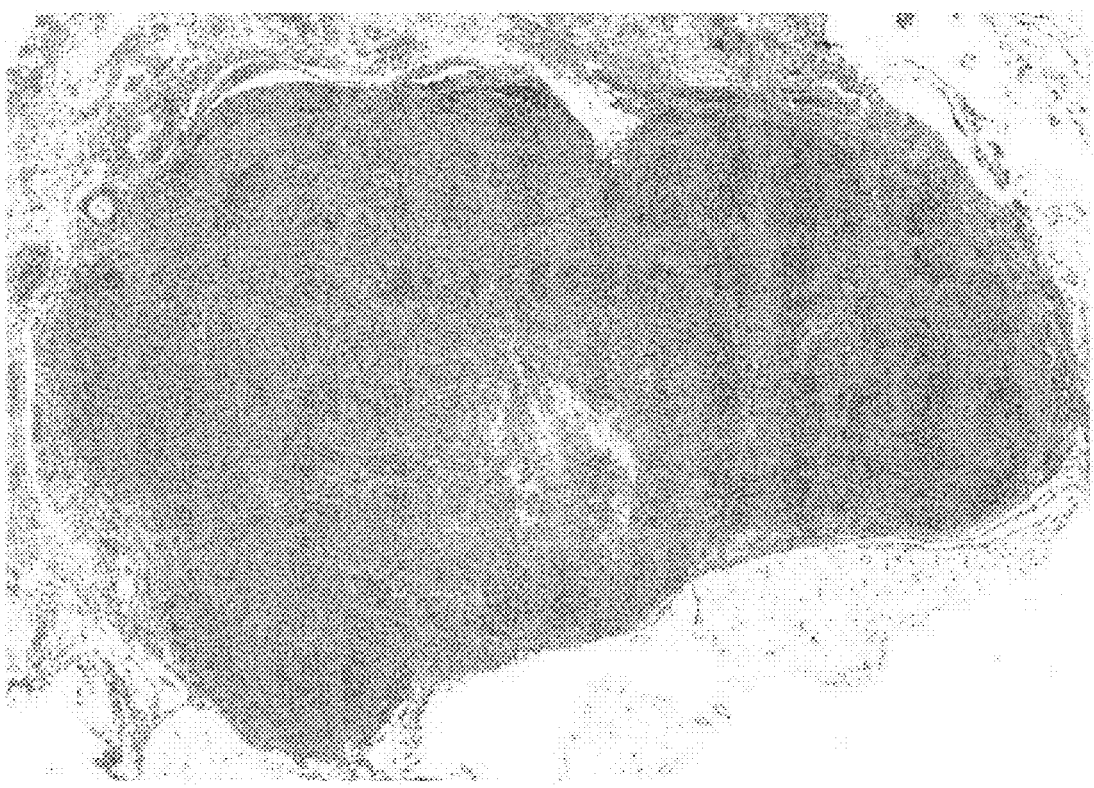
FIG. 8 illustrates an example embodiment of a markup image of color coded image block quality score.
Figure 9:
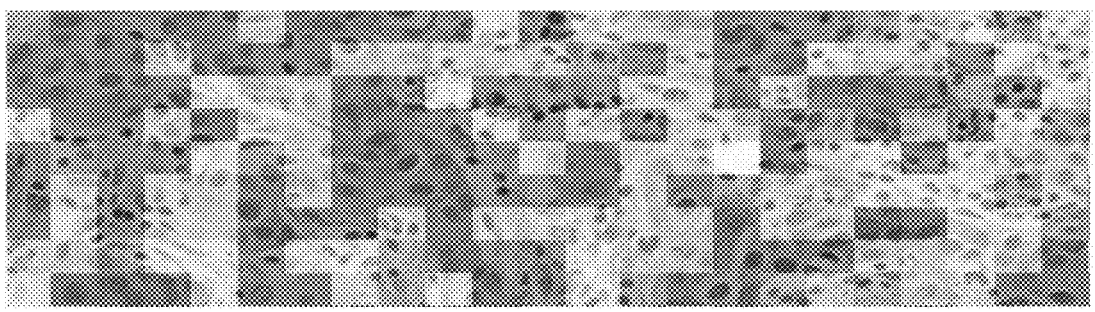
FIG. 9 illustrates an example of a high resolution cut out of a markup image of a low quality area.
Figure 10:
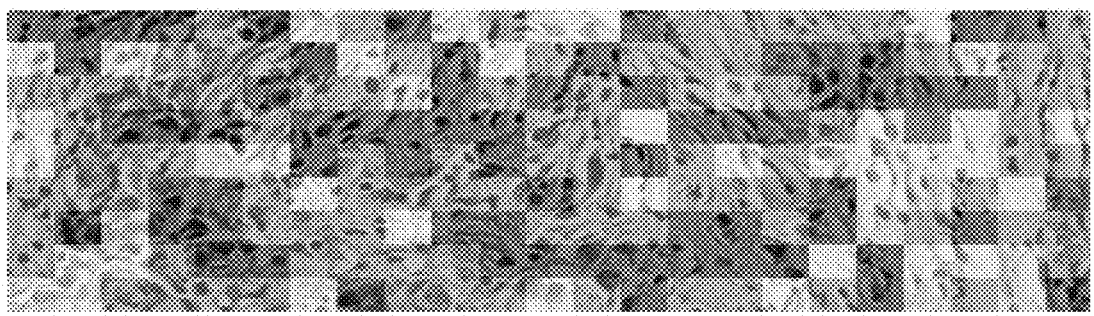
FIG. 10 illustrates an example of a high resolution cut out of a markup image of a high quality area.

FIG. 8 illustrates an example embodiment of a markup image of color coded image block quality scores. A benefit of the example embodiment is that a glance at the markup image gives the reviewer an instant visual understanding of the whole slide quality. FIG. 9 illustrates an example of a high resolution cut out of a markup image of a low quality area. The red and orange areas are indications of lower quality and yellow areas are passable. FIG. 10 illustrates an example of a high resolution cut out of a markup image of a high quality area. When the markup image is predominantly blue and green the slide quality is very good. FIG. 11 illustrates an example of a high resolution cut out of the markup image displaying an edge effect from scanning. The small block sizes provide accurate determination of image capture artifacts, shown by a sparse red line of poor quality mixed with blocks of varying quality.

At step 135, process 100 generates a score map that is compiled for use by a macro-analysis process, as exemplified below. The dimensions of the score map are compared to the image size scaled by the image block size. Each of its pixel values may represent the block's quality score, ranging from 0 to 100 or an indication that the block was classified as white space or was not processed.

Process 100 ends at step 140.

Macro-Analysis

Figures 3, 4A, 4B:
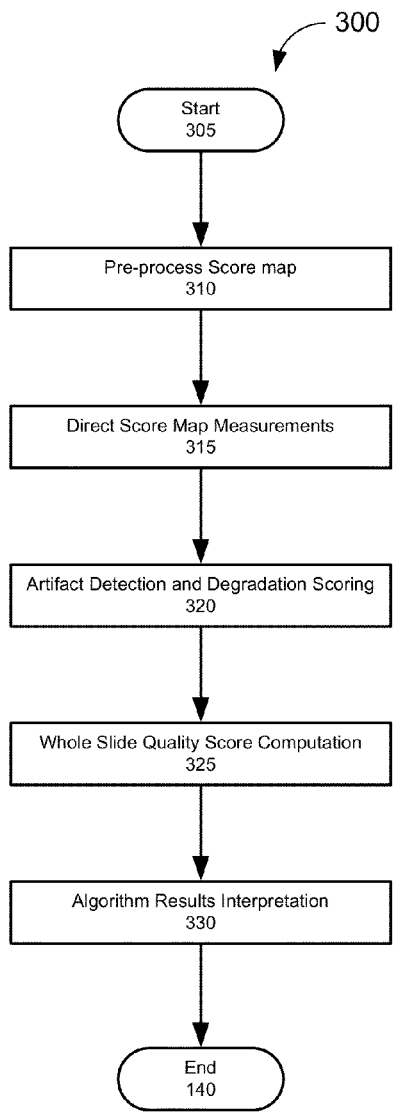
FIG. 3 is a schematic flow diagram illustrating one embodiment of a method of a macro-analysis process.
FIG. 4A is a block diagram illustrating an example embodiment of a system for determining the quality of a digital microscope slide.
FIG. 4B is a block diagram illustrating example modules found in a scanning system.

The Macro-analysis process summarizes the slide quality, the amount of specimen measured and the location of scan-hardware related artifacts. The macro-analysis compiles informational trends among all of those small image parts to form the slide quality score. FIG. 3 illustrates an example embodiment of a macro-analysis process 300 performed by a slide analysis system in accordance with the present invention.

Macro-analysis process 300 begins at step 305. In the example embodiment, prior to beginning process 300, all image blocks are analyzed in micro-analysis process 100. Macro-analysis process 300 receives the score map, described in step 135 above. Alternatively, the system may function in parallel, pipelining the image blocks from micro-analysis process 100 to macro-analysis process 300 as the necessary blocks are processed.

At step 305, process 300 pre-processes the blocks. Pre-processing builds on block qualification step 115 from micro-analysis process 100. Previously, step 115 labeled blocks containing questionable content (e.g., the blocks included folds, saturated specimen, foreign materials) as not processed. Step 305 removes the scores on the specimen edges and fragments in the score map so that they are ignored in the subsequent steps in macro-analysis process 300.

At step 310, process 300 determines the percentage of specimen analyzed. This percentage may serve as an indicator of specimen artifacts. The percentage value may also be used as a confidence measure for the final whole slide quality score. For example, if only 70% of the specimen was deemed fit to process, it might be recommended that a quality control technician review the digital slide and its markup image to make a final decision upon the slide's readiness for pathologist diagnosis. Also, an average score can be directly computed from the preprocessed score map. However, one limitation of this approach is that locales of poor focus (i.e., low scores) may not significantly impact an image with blocks with average values of overwhelmingly high scores. For example, the average quality score for the digital slide may be 71 when considered on a scale of 0 to 100. However, the average score of 71 may not reflect the slide's poor quality with respect to specific areas.

At step 320, process 300 performs artifact detection and degradation scoring. digital pathology scanners have common and unique hardware capture related artifacts that they may introduce into the digital slide. For example, a scanner may capture areas of the slide out of focus, have blurred edges along the capture field of view, or introduce light reflections or illumination fluctuations that cause photometric variations and motion blur. Step 320 may detect these artifacts and measure their impact (degradation) upon the slide quality.

The following example embodiment illustrates example of two types of artifacts (i.e. image capture and local area artifacts). However, various other artifacts may be detected and the scoring thereby adjusted appropriately.

Image Capture Artifacts: digital pathology scanners use either area or linear cameras to receive the image in the optical field of view and digitize it. Area cameras capture snapshots that are tiled together in a mosaic format to produce the large digital slide. Linear cameras continuously capture strips along one dimension of the image and assemble each strip adjacent to the next.

A scanner based upon an area camera can have both horizontal and vertical striping along the two dimensions of the captured tile. The striping can be caused by optical fall off that degrades the image focus, tilt between the camera's focal plane and the stage holding the glass slide, and other such optical-mechanical design issues. A scanner based upon a linear camera will only have a striping effect along one dimension, the direction of motion.

A search for score discontinuity trends along the horizontal and vertical dimensions in the score map is performed by assembling score profiles. The score profiles computed in the horizontal and vertical directions can identify area or linear camera related edge defects. However, the score map may be further partitioned and those partitions independently examined for defects. For example, four vertical profiles could be created by partitioning the score map into four (4) horizontal regions. The gradient magnitude of each discontinuity in each profile is measured. Those with large enough magnitudes are flagged as defective. The magnitude and the proportion of the area of the image that is affected by the discontinuity are factored into a degradation score for each of the detected image capture related artifacts.

Local Area Artifacts: A region of the digital slide with poor quality is apparent on the markup image as a local area with a higher density of red and orange colored blocks. Poor quality regions appear in the score map as areas with high densities of low scores. The areas that have a predetermined density of low score and size requirements are flagged as defective. The region size and its density of poor scores are factored into a degradation score for each of the detected local area artifacts.

One additional step is taken by each artifact detection algorithm. If an artifact is detected, the affected area in the score map is labeled such that the subsequent artifact detection algorithm will not integrate it.

Figure 12:
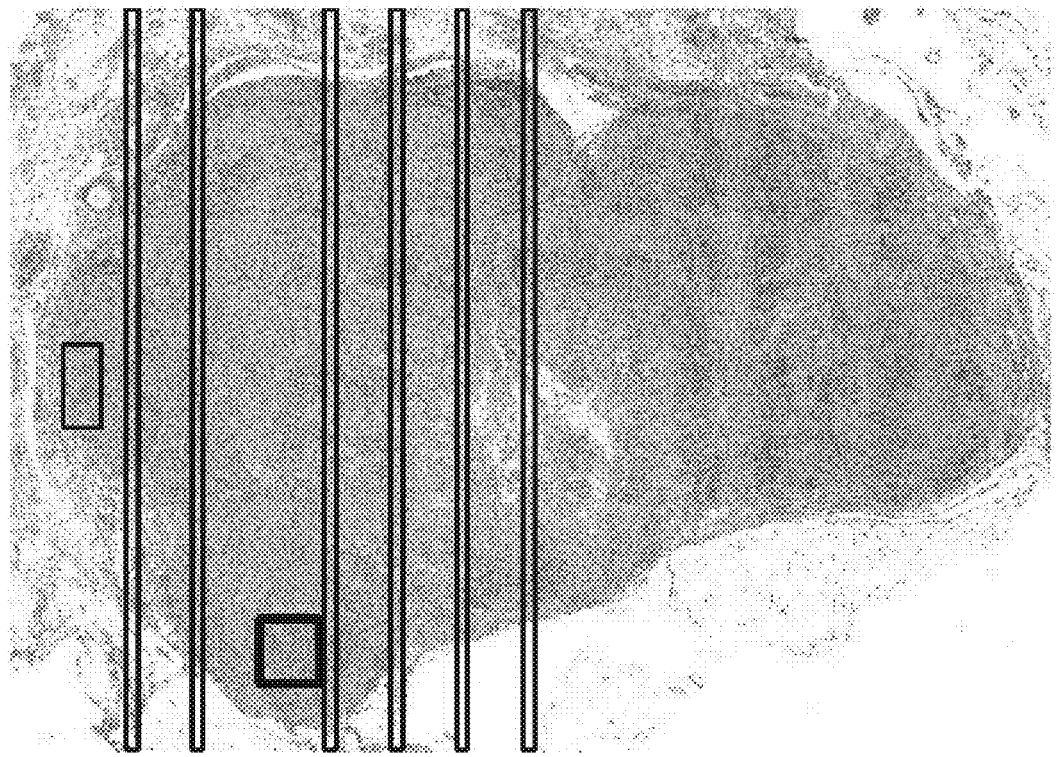
FIG. 12 illustrates an example of bounding box outlines around the edge of area artifacts detected on a sample scan.

FIG. 12 illustrates an example of bounding box outlines around the edge of area artifacts detected on a sample scan. The long, thin boxes contain image capture edge artifacts and the smaller rectangles contain local area artifacts. It is notable that the right side of each edge artifact outline is part of the area affected by the defect and is not illustrated in this diagram. There are many other kinds of scanner artifacts that can be identified and their severity judged. For example, motion artifacts that shift red color planes, instrument resonance, and scan velocity ripple may manifest themselves as patterns in the score map.

At step 325, process 300 computes the whole slide quality score. The whole slide quality score may be computed as the average score minus each artifact degradation score. The whole slide quality score ("WSQ score") ranges from 100 to 0.

At step 330, the system provides for the interpretation of the WSQ score, as determined by a study comparing an expert's quality rating against that of the system. The provided comparative score may be established by generating a comparative scoring system based on expert rating as compared with system rating executed on the digital slide set. The interpreted results may include a summarized result set including a WSQ score, a whole slide average score, an artifact degradation score, the percentage of specimen analyzed, a markup image of color coded score distributions, and annotated defective artifacts.

A user of the system may choose to work with one or more these results. For example, the WSQ score may suffice to pass, fail, or visually inspect a slide. Alternatively, the mere presence of an artifact may be enough to require visual review.

In one embodiment, the WSQ score (or even the average score) may be required to exceed a threshold to pass a quality control inspection. In another alternative embodiment, instead of using any of the three scores, a user may always want to visually interpret the markup image to find artifacts that may not have been quantified.

For example, in one application, after computing an overall score for each scan in the range of 1-100, the system may determine whether the slide is satisfactory or needs further inspection by comparing the overall score to a threshold value; this provides a significant savings in laboratory technician time since the majority of slides may prove satisfactory. If the score is lower than a given threshold, the slide is considered unsatisfactory and may be rescanned. In this case, the slide may be rescanned "manually" by the lab technician in order to obtain a better result, or unsatisfactory slides may be auto-scanned in a batch, and then only those slides that fail to rescan successfully may be manually scanned. In further alternative embodiments, the system may tag certain slides as neither satisfactory nor unsatisfactory, if the slides results fall between two thresholds, representative of satisfactory and unsatisfactory slides. These mid-range slides, representing a small fraction of the scanned slides may be manually inspected by lab technicians.

In application, the system may be employed in various aspects. During assembly of the slide scanner, the system may provide quantitative and visual feedback as technicians assemble the slide scanner, identifying scan artifacts that cue the technician to necessary alignment tasks. During scanner manufacturing, the processes may provide quantitative acceptance criteria and provide quality assurance. In a field service scenario, the system may aid in preventive maintenance checks or after service calls. That is, aside from operating in its pathology aimed purpose, the system may provide a means to verify that the scanner is operating within acceptable ranges by scanning a master glass slide and verifying quantitative and visual performance. In an operational scenario, the system may identify locations of poor focus and instruct the scanner to automatically rescan the slide and add special focus to those areas. In a clinical laboratory, the quantitative score may serve as an automatic quality control assessment. Also, a screening technician could use the combination of the quantitative score and the visual heat map to judge the image quality.

FIG. 4A is a network diagram illustrating an example scanner system 400 according to an embodiment of the invention. In the illustrated embodiment, the system 400 comprises a scanning system 440 that is configured with a data storage area 445. The scanning system 440 is communicatively coupled with a user station 430, and an image server system 450 via a data communication network 460. Each of the user stations 430 and image server systems 450 are configured with a data storage area 425, 435 and 455, respectively. The data storage areas 425, 435, 445 and 455 may include volatile and persistent storage including for example, random access memory and hard disk drives. The network 460 can be any of a variety of network types including wired and wireless, public and private, or any combination of communication networks, such as the Internet.

In operation, the scanning system 440 may digitize a plurality of samples to create a corresponding plurality of digital slide images that can be stored on the scanning system 440 or on the image server system 450. The scanning system 440 may be operated directly or remotely by an operator at the operator station 420. The digital slide images located at the scanning system 440 or the image server system 450 may be viewed by a user at the user station 430, where the digital image data is provided to the user station 430 via the network 460.

While the example embodiment of scanning system 400 is presented as a distributed system linked via network 460, the system can also be arranged as a single computer system, or may include a large number of disparate systems for scanning and storing the digital image slides.

FIG. 4B is a block diagram illustrating an example set of modules in scanner system 440 according to an embodiment of the invention. In the illustrated embodiment, the scanner system 440 may include a tissue sample acquisition module 505, a micro-analysis module 510, a macro-analysis module 515, and a visualization module 520. In certain combinations, the various illustrated modules collaborate to perform whole slide analysis, in accordance with previously described processes.

Tissue sample acquisition module 505 operates to obtain an initial digital slide image from a microscope slide scanner or another source. This may include management of the scanner during scanning to handle automatic focus, exposure control, etc. Alternatively, the tissue sample acquisition module 505 may retrieve a digital sample slide from an available database.

Micro-analysis module 510 evaluates the whole image by breaking it down into extraordinarily small parts and performing quality analysis on each of those parts. This evaluation may be performed in accordance with micro-analysis process 100 in FIG. 1.

Macro-analysis module 515 summarizes the slide quality, the amount of specimen measured, and the location of scan-hardware related artifacts. The macro-analysis compiles informational trends among all of those small image parts to form the slide quality score. This process may be performed in accordance with the macro-analysis process 300 in FIG. 3.

Visualization module 520 operates to facilitate viewing of the digital slide image file. Image viewing adjustments such as brightness, contrast, gamma and false coloring are automatically determined using the stored image descriptors and the acquisition settings. In one embodiment, viewing adjustments can be made by a user at the user station 430 for the individual images and/or for a fused image (i.e., the combined image of two or more individual channel images). In addition, when viewing a fused image, the relative translation and rotation corrections may be adjusted.

Interactive image exploration tools may also be enabled by the digital visualization module 520 to instantly access responses on a cellular basis. Additionally, predetermined regions of interest may contain annotation that can be displayed to a user at the user station 430 to indicate meaningful biologic responses or to automatically quantitatively analyze responses. Additionally, the visualization and analysis module 520 may provide a user at the user station 430 with tools to annotate regions of interest and then store such annotations in the digital slide image file in relation to the base layer image. Advantageously, such annotations can be a useful to guide to document artifacts in an image, regions of interest in an image, or to identify a region of an image for reporting or quantitative analysis.

Additionally, the visualization module 520 may use predetermined or otherwise identified image features to locate similar image data or patterns using content based image retrieval techniques. Advantageously, this utility can provide a user at the user station 30 with related case information and image data.

In one embodiment, a client-server architecture permits a user at the user station 30 to view a digital slide image located at the image server system 50 or the scanning system 40 by requesting the compressed image tiles at a specified pyramid level on an as-needed basis and by performing client side caching of tiles in anticipation of user requests.

The digital visualization and analysis module 520 additionally operates to facilitate whole slide quantitative analysis of the digital slide images, whether the image is a quadrant style image or a fused style image. In one embodiment, the digital visualization and analysis module 520 can facilitate a quantitative analysis of a particular region of interest instead of the entire digital slide image. Analysis results can be stored in a data storage area such as data storage areas 445, 455, or 435 for use with data management and reporting.

Figure 5A:
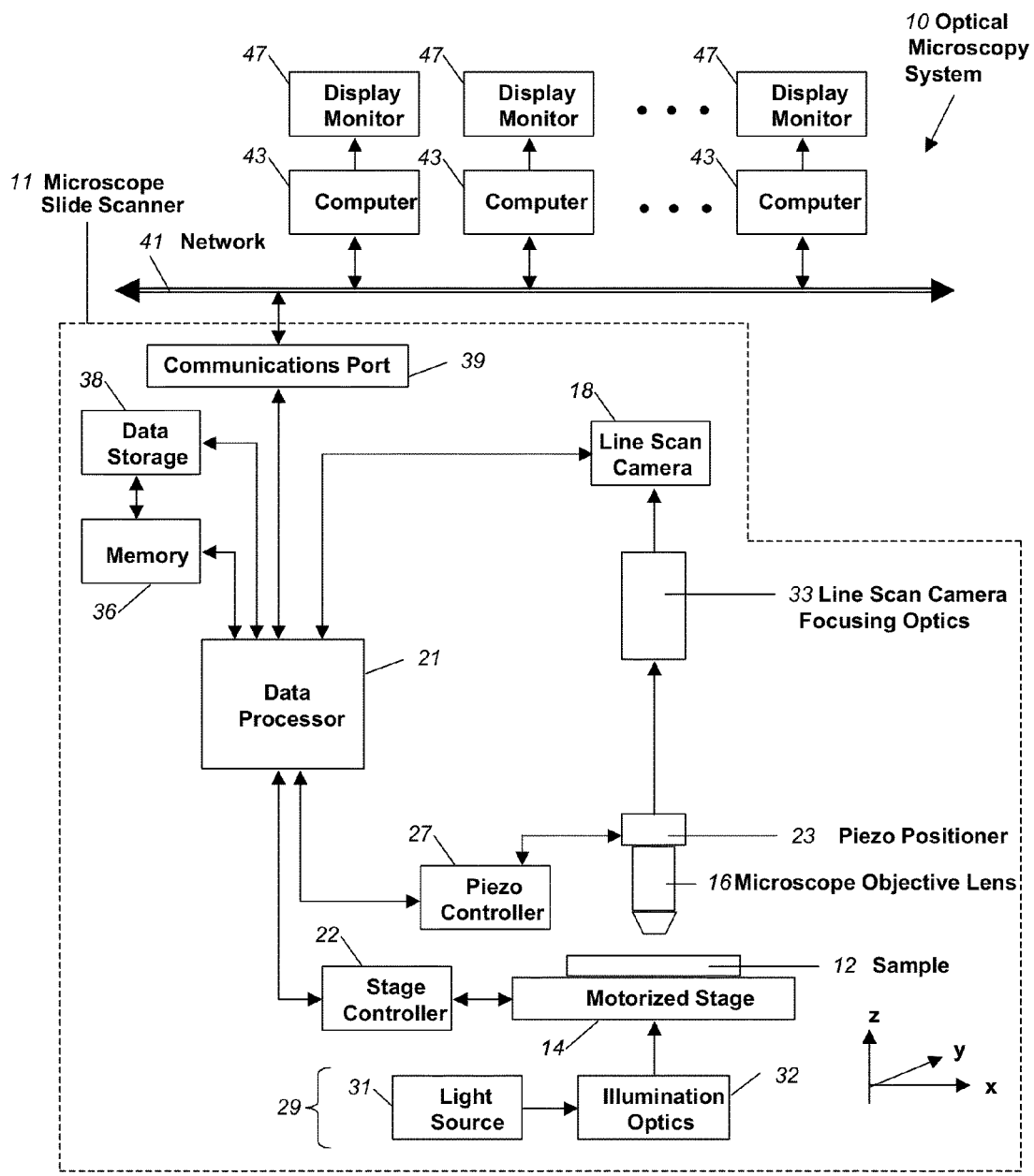
FIG. 5A is a block diagram of a first embodiment of an optical microscopy system according to the present invention.

FIG. 5A illustrates a block diagram of a preferred embodiment of an optical microscopy system 10 according to the present invention is shown. The heart of the system 10 is a microscope slide scanner 11 that serves to scan and digitize a specimen or sample 12. The sample 12 can be anything that may be interrogated by optical microscopy. For instance, the sample 12 may be a microscope slide or other sample type that may be interrogated by optical microscopy. A microscope slide is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 12 may also be an array of any type of DNA or DNA-related material such as cDNA or RNA or protein that is deposited on any type of slide or other substrate, including any and all samples commonly known as a microarrays. The sample 12 may be a microtiter plate, for example a 96-well plate. Other examples of the sample 12 include integrated circuit boards, electrophoresis records, petri dishes, film, semiconductor materials, forensic materials, or machined parts.

The scanner 11 includes a motorized stage 14, a microscope objective lens 16, a line scan camera 18, and a data processor 20. The sample 12 is positioned on the motorized stage 14 for scanning. The motorized stage 14 is connected to a stage controller 22 which is connected in turn to the data processor 20. The data processor 20 determines the position of the sample 12 on the motorized stage 14 via the stage controller 22. In the presently preferred embodiment, the motorized stage 14 moves the sample 12 in at least the two axes (x/y) that are in the plane of the sample 12. Fine movements of the sample 12 along the optical z-axis may also be necessary for certain applications of the scanner 11, for example, for focus control. Z-axis movement is preferably accomplished with a piezo positioner 24, such as the PIFOC from Polytec PI or the MIPOS 3 from Piezosystem Jena. The piezo positioner 24 is attached directly to the microscope objective 16 and is connected to and directed by the data processor 20 via a piezo controller 26. A means of providing a coarse focus adjustment may also be needed and can be provided by z-axis movement as part of the motorized stage 14 or a manual rack-and-pinion coarse focus adjustment (not shown).

In the presently preferred embodiment, the motorized stage 14 includes a high precision positioning table with ball bearing linear ways to provide smooth motion and excellent straight line and flatness accuracy. For example, the motorized stage 14 could include two Daedal model 106004 tables stacked one on top of the other. Other types of motorized stages 14 are also suitable for the scanner 11, including stacked single axis stages based on ways other than ball bearings, single- or multiple-axis positioning stages that are open in the center and are particularly suitable for trans-illumination from below the sample, or larger stages that can support a plurality of samples. In the presently preferred embodiment, motorized stage 14 includes two stacked single-axis positioning tables, each coupled to two millimeter lead-screws and Nema-23 stepping motors. At the maximum lead screw speed of twenty-five revolutions per second, the maximum speed of the sample 12 on the motorized stage 14 is fifty millimeters per second. Selection of a lead screw with larger diameter, for example five millimeters, can increase the maximum speed to more than 100 millimeters per second. The motorized stage 14 can be equipped with mechanical or optical position encoders which has the disadvantage of adding significant expense to the system. Consequently, the presently preferred embodiment does not include position encoders. However, if one were to use servo motors in place of stepping motors, then one would have to use position feedback for proper control.

Position commands from the data processor 20 are converted to motor current or voltage commands in the stage controller 22. In the presently preferred embodiment, the stage controller 22 includes a 2-axis servo/stepper motor controller (Compumotor 6K2) and two 4-amp microstepping drives (Compumotor OEMZL4). Microstepping provides a means for commanding the stepper motor in much smaller increments than the relatively large single 1.8 degree motor step. For example, at a microstep of 100, the sample 12 can be commanded to move at steps as small as 0.1 micrometer. A microstep of 25,000 is used in the presently preferred embodiment of this invention. Smaller step sizes are also possible. It should be obvious that the optimum selection of the motorized stage 14 and the stage controller 22 depends on many factors, including the nature of the sample 12, the desired time for sample digitization, and the desired resolution of the resulting digital image of the sample 12.

The microscope objective lens 16 can be any microscope objective lens commonly available. One of ordinary skill in the art will realize that the choice of which objective lens to use will depend on the particular circumstances. In the preferred embodiment of the present invention, the microscope objective lens 16 is of the infinity-corrected type.

The sample 12 is illuminated by an illumination system 28 that includes a light source 30 and illumination optics 32. The light source 30 in the presently preferred embodiment includes a variable intensity halogen light source with a concave reflective mirror to maximize light output and a KG-1 filter to suppress heat. However, the light source 30 could also be any other type of arc-lamp, laser, or other source of light. The illumination optics 32 in the presently preferred embodiment include a standard Köhler illumination system with two conjugate planes that are orthogonal to the optical axis. The illumination optics 32 are representative of the bright-field illumination optics that can be found on most commercially available compound microscopes sold by companies such as Carl Zeiss, Nikon, Olympus, or Leica. One set of conjugate planes includes (i) a field iris aperture illuminated by the light source 30, (ii) the object plane that is defined by the focal plane of the sample 12, and (iii) the plane containing the light-responsive elements of the line scan camera 18. A second conjugate plane includes (i) the filament of the bulb that is part of the light source 30, (ii) the aperture of a condenser iris that sits immediately before the condenser optics that are part of the illumination optics 32, and (iii) the back focal plane of the microscope objective lens 16. In the presently preferred embodiment, the sample 12 is illuminated and imaged in transmission mode, with the line scan camera 18 sensing optical energy that is transmitted by the sample 12, or conversely, optical energy that is absorbed by the sample 12.

The scanner 11 of the present invention is equally suitable for detecting optical energy that is reflected from the sample 12, in which case the light source 30, the illumination optics 32, and the microscope objective lens 16 must be selected based on compatibility with reflection imaging. One possible embodiment may therefore be illumination through a fiber optic bundle that is positioned above the sample 12. Other possibilities include excitation that is spectrally conditioned by a monochromator. If the microscope objective lens 16 is selected to be compatible with phase-contrast microscopy, then the incorporation of at least one phase stop in the condenser optics that are part of the illumination optics 32 will enable the scanner 11 to be used for phase contrast microscopy. To one of ordinary skill in the art, the modifications required for other types of microscopy such as differential interference contrast and confocal microscopy should be readily apparent. Overall, the scanner 11 is suitable, with appropriate but well-known modifications, for the interrogation of microscopic samples in any known mode of optical microscopy.

Between the microscope objective lens 16 and the line scan camera 18 are situated the line scan camera focusing optics 34 that focus the optical signal captured by the microscope objective lens 16 onto the light-responsive elements of the line scan camera 18. In a modern infinity-corrected microscope the focusing optics between the microscope objective lens and the eyepiece optics, or between the microscope objective lens and an external imaging port, consist of an optical element known as a tube lens that is part of a microscope's observation tube. Many times the tube lens consists of multiple optical elements to prevent the introduction of coma or astigmatism. One of the motivations for the relatively recent change from traditional finite tube length optics to infinity corrected optics was to increase the physical space in which the optical energy from the sample 12 is parallel, meaning that the focal point of this optical energy is at infinity. In this case, accessory elements like dichroic mirrors or filters can be inserted into the infinity space without changing the optical path magnification or introducing undesirable optical artifacts.

Infinity-corrected microscope objective lenses are typically inscribed with an infinity mark. The magnification of an infinity corrected microscope objective lens is given by the quotient of the focal length of the tube lens divided by the focal length of the objective lens. For example, a tube lens with a focal length of 180 millimeters will result in 20× magnification if an objective lens with 9 millimeter focal length is used. One of the reasons that the objective lenses manufactured by different microscope manufacturers are not compatible is because of a lack of standardization in the tube lens focal length. For example, a 20× objective lens from Olympus, a company that uses a 180 millimeter tube lens focal length, will not provide a 20× magnification on a Nikon microscope that is based on a different tube length focal length of 200 millimeters. Instead, the effective magnification of such an Olympus objective lens engraved with 20× and having a 9 millimeter focal length will be 22.2×, obtained by dividing the 200 millimeter tube lens focal length by the 9 millimeter focal length of the objective lens. Changing the tube lens on a conventional microscope is virtually impossible without disassembling the microscope. The tube lens is part of a critical fixed element of the microscope. Another contributing factor to the incompatibility between the objective lenses and microscopes manufactured by different manufacturers is the design of the eyepiece optics, the binoculars through which the specimen is observed. While most of the optical corrections have been designed into the microscope objective lens, most microscope users remain convinced that there is some benefit in matching one manufacturers' binocular optics with that same manufacturers' microscope objective lenses to achieve the best visual image.

The line scan camera focusing optics 34 include a tube lens optic mounted inside of a mechanical tube. Since the scanner 11, in its preferred embodiment, lacks binoculars or eyepieces for traditional visual observation, the problem suffered by conventional microscopes of potential incompatibility between objective lenses and binoculars is immediately eliminated. One of ordinary skill will similarly realize that the problem of achieving parfocality between the eyepieces of the microscope and a digital image on a display monitor is also eliminated by virtue of not having any eyepieces. Since the scanner 11 also overcomes the field of view limitation of a traditional microscope by providing a field of view that is practically limited only by the physical boundaries of the sample 12, the importance of magnification in an all-digital imaging microscope such as provided by the present scanner 11 is limited. Once a portion of the sample 12 has been digitized, it is straightforward to apply electronic magnification, sometimes known as electric zoom, to an image of the sample 12 in order to increase its magnification. Increasing the magnification of an image electronically has the effect of increasing the size of that image on the monitor that is used to display the image. If too much electronic zoom is applied, then the display monitor will be able to show only portions of the magnified image. It is not possible, however, to use electronic magnification to display information that was not present in the original optical signal that was digitized in the first place. Since one of the objectives of the scanner 11 is to provide high quality digital images, in lieu of visual observation through the eyepieces of a microscope, it is important that the content of the images acquired by the scanner 11 include as much image detail as possible. The term resolution is typically used to describe such image detail and the term diffraction-limited is used to describe the wavelength-limited maximum spatial detail available in an optical signal. The scanner 11 provides diffraction-limited digital imaging by selection of a tube lens focal length that is matched according to the well know Nyquist sampling criteria to both the size of an individual pixel element in a light-sensing camera such as the line scan camera 18 and to the numerical aperture of the microscope objective lens 16. It is well known that numerical aperture, not magnification, is the resolution-limiting attribute of a microscope objective lens 16.

An example will help to illustrate the optimum selection of a tube lens focal length that is part of the line scan camera focusing optics 34. Consider again the 20× microscope objective lens 16 with 9 millimeter focal length discussed previously and assume that this objective lens has a numerical aperture of 0.50. Assuming no appreciable degradation from the condenser, the diffraction-limited resolving power of this objective lens at a wavelength of 500 nanometers is approximately 0.6 micrometers, obtained using the well-known Abbe relationship. Assume further that the line scan camera 18, which in its preferred embodiment has a plurality of 14 micrometer square pixels, is used to detect a portion of the sample 12. In accordance with sampling theory, it is necessary that at least two sensor pixels subtend the smallest resolvable spatial feature. In this case, the tube lens must be selected to achieve a magnification of 46.7, obtained by dividing 28 micrometers, which corresponds to two 14 micrometer pixels, by 0.6 micrometers, the smallest resolvable feature dimension. The optimum tube lens optic focal length is therefore about 420 millimeters, obtained by multiplying 46.7 by 9. The line scan focusing optics 34 with a tube lens optic having a focal length of 420 millimeters will therefore be capable of acquiring images with the best possible spatial resolution, similar to what would be observed by viewing a specimen under a microscope using the same 20× objective lens. To reiterate, the scanner 11 utilizes a traditional 20× microscope objective lens 16 in a higher magnification optical configuration, in this example about 47×, in order to acquire diffraction-limited digital images. If a traditional 20× magnification objective lens 16 with a higher numerical aperture were used, say 0.75, the required tube lens optic magnification for diffraction-limited imaging would be about 615 millimeters, corresponding to an overall optical magnification of 68×. Similarly, if the numerical aperture of the 20× objective lens were only 0.3, the optimum tube lens optic magnification would only be about 28×, which corresponds to a tube lens optic focal length of approximately 252 millimeters. The line scan camera focusing optics 34 are modular elements of the scanner 11 and can be interchanged as necessary for optimum digital imaging. The advantage of diffraction-limited digital imaging is particularly significant for applications, for example bright field microscopy, in which the reduction in signal brightness that accompanies increases in magnification is readily compensated by increasing the intensity of an appropriately designed illumination system 28.

In principle, it is possible to attach external magnification-increasing optics to a conventional microscope-based digital imaging system to effectively increase the tube lens magnification so as to achieve diffraction-limited imaging as has just been described for the present scanner 11; however, the resulting decrease in the field of view is often unacceptable, making this approach impractical. Furthermore, many users of microscopes typically do not understand enough about the details of diffraction-limited imaging to effectively employ these techniques on their own. In practice, digital cameras are attached to microscope ports with magnification-decreasing optical couplers to attempt to increase the size of the field of view to something more similar to what can be seen through the eyepiece. The standard practice of adding de-magnifying optics is a step in the wrong direction if the goal is to obtain diffraction-limited digital images.

In a conventional microscope, different power objectives lenses are typically used to view the specimen at different resolutions and magnifications. Standard microscopes have a nosepiece that holds five objectives lenses. In an all-digital imaging system such as the present scanner 11 there is a need for only one microscope objective lens 16 with a numerical aperture corresponding to the highest spatial resolution desirable. The presently preferred embodiment of the scanner 11 provides for only one microscope objective lens 16. Once a diffraction-limited digital image has been captured at this resolution, it is straightforward using standard digital image processing techniques, to present imagery information at any desirable reduced resolutions and magnifications.

The presently preferred embodiment of the scanner 11 is based on a Dalsa SPARK line scan camera 18 with 1024 pixels (picture elements) arranged in a linear array, with each pixel having a dimension of 14 by 14 micrometers. Any other type of linear array, whether packaged as part of a camera or custom-integrated into an imaging electronic module, can also be used. The linear array in the presently preferred embodiment effectively provides eight bits of quantization, but other arrays providing higher or lower level of quantization may also be used. Alternate arrays based on 3-channel red-green-blue (RGB) color information or time delay integration (TDI), may also be used. TDI arrays provide a substantially better signal-to-noise ratio (SNR) in the output signal by summing intensity data from previously imaged regions of a specimen, yielding an increase in the SNR that is in proportion to the square-root of the number of integration stages. TDI arrays can comprise multiple stages of linear arrays. TDI arrays are available with 24, 32, 48, 64, 96, or even more stages. The scanner 11 also supports linear arrays that are manufactured in a variety of formats including some with 512 pixels, some with 1024 pixels, and others having as many as 4096 pixels. Appropriate, but well known, modifications to the illumination system 28 and the line scan camera focusing optics 34 may be required to accommodate larger arrays. Linear arrays with a variety of pixel sizes can also be used in scanner 11. The salient requirement for the selection of any type of line scan camera 18 is that the sample 12 can be in motion with respect to the line scan camera 18 during the digitization of the sample 12 in order to obtain high quality images, overcoming the static requirements of the conventional imaging tiling approaches known in the prior art.

The output signal of the line scan camera 18 is connected to the data processor 20. The data processor 20 in the presently preferred embodiment includes a central processing unit with ancillary electronics, for example a motherboard, to support at least one signal digitizing electronics board such as an imaging board or a frame grabber. In the presently preferred embodiment, the imaging board is an EPIX PIXCID24 PCI bus imaging board, however, there are many other types of imaging boards or frame grabbers from a variety of manufacturers which could be used in place of the EPIX board. An alternate embodiment could be a line scan camera that uses an interface such as IEEE 1394, also known as Firewire, to bypass the imaging board altogether and store data directly on a data storage 38, such as a hard disk.

The data processor 20 is also connected to a memory 36, such as random access memory (RAM), for the short-term storage of data, and to the data storage 38, such as a hard drive, for long-term data storage. Further, the data processor 20 is connected to a communications port 40 that is connected to a network 42 such as a local area network (LAN), a wide area network (WAN), a metropolitan area network (MAN), an intranet, an extranet, or the global Internet. The memory 36 and the data storage 38 are also connected to each other. The data processor 20 is also capable of executing computer programs, in the form of software, to control critical elements of the scanner 11 such as the line scan camera 18 and the stage controller 22, or for a variety of image-processing functions, image-analysis functions, or networking. The data processor 20 can be based on any operating system, including operating systems such as Windows, Linux, OS/2, Mac OS, and Unix. In the presently preferred embodiment, the data processor 20 operates based on the Windows NT operating system.

The data processor 20, memory 36, data storage 38, and communication port 40 are each elements that can be found in a conventional computer. One example would be a personal computer such as a Dell Dimension XPS T500 that features a Pentium III 500 MHz processor and up to 756 megabytes (MB) of RAM. In the presently preferred embodiment, the computer, elements which include the data processor 20, memory 36, data storage 38, and communications port 40 are all internal to the scanner 11, so that the only connection of the scanner 11 to the other elements of the system 10 is the communication port 40. In an alternate embodiment of the scanner 11, the computer elements would be external to the scanner 11 with a corresponding connection between the computer elements and the scanner 11.

The scanner 11, in the presently preferred embodiment of the invention, integrates optical microscopy, digital imaging, motorized sample positioning, computing, and network-based communications into a single-enclosure unit. The major advantage of packaging the scanner 11 as a single-enclosure unit with the communications port 40 as the primary means of data input and output are reduced complexity and increased reliability. The various elements of the scanner 11 are optimized to work together, in sharp contrast to traditional microscope-based imaging systems in which the microscope, light source, motorized stage, camera, and computer are typically provided by different vendors and require substantial integration and maintenance.

The communication port 40 provides a means for rapid communications with the other elements of the system 10, including the network 42. The presently preferred communications protocol for the communications port 40 is a carrier-sense multiple-access collision detection protocol such as Ethernet, together with the TCP/IP protocol for transmission control and internetworking. The scanner 11 is intended to work with any type of transmission media, including broadband, baseband, coaxial cable, twisted pair, fiber optics, DSL or wireless.

In the presently preferred embodiment, control of the scanner 11 and review of the imagery data captured by the scanner 11 are performed on a computer 44 that is connected to the network 42. The computer 44, in its presently preferred embodiment, is connected to a display monitor 46 to provide imagery information to an operator. A plurality of computers 44 may be connected to the network 42. In the presently preferred embodiment, the computer 44 communicates with the scanner 11 using a network browser such as Internet Explorer from Microsoft or Netscape Communicator from AOL. Images are stored on the scanner 11 in a common compressed format such a JPEG which is an image format that is compatible with standard image-decompression methods that are already built into most commercial browsers. Other standard or non-standard, lossy or lossless, image compression formats will also work. In the presently preferred embodiment, the scanner 11 is a webserver providing an operator interface that is based on webpages that are sent from the scanner 11 to the computer 44. For dynamic review of imagery data, the currently preferred embodiment of the scanner 11 is based on playing back, for review on the display monitor 46 that is connected to the computer 44, multiple frames of imagery data using standard multiple-frame browser compatible software packages such as Media-Player from Microsoft, Quicktime from Apple Computer, or Real-Player from Real Networks. In the presently preferred embodiment, the browser on the computer 44 uses the hypertext transmission protocol (http) together with TCP for transmission control.

There are, and will be in the future, many different means and protocols by which the scanner 11 could communicate with the computer 44, or a plurality of computers. While the presently preferred embodiment is based on standard means and protocols, the approach of developing one or multiple customized software modules known as applets is equally feasible and may be desirable for selected future applications of the scanner 11. Further, there are no constraints that computer 44 be of any specific type such as a personal computer (PC) or be manufactured by any specific company such as Dell. One of the advantages of a standardized communications port 40 is that any type of computer 44 operating common network browser software can communicate with the scanner 11.

If one so desires, it is possible, with some modifications to the scanner 11, to obtain spectrally resolved images. Spectrally resolved images are images in which spectral information is measured at every image pixel. Spectrally resolved images could be obtained by replacing the line scan camera 18 of the scanner 11 with an optical slit and an imaging spectrograph. The imaging spectrograph uses a two-dimensional CCD detector to capture wavelength-specific intensity data for a column of image pixels by using a prism or grating to disperse the optical signal that is focused on the optical slit along each of the rows of the detector.

Figure 5B:
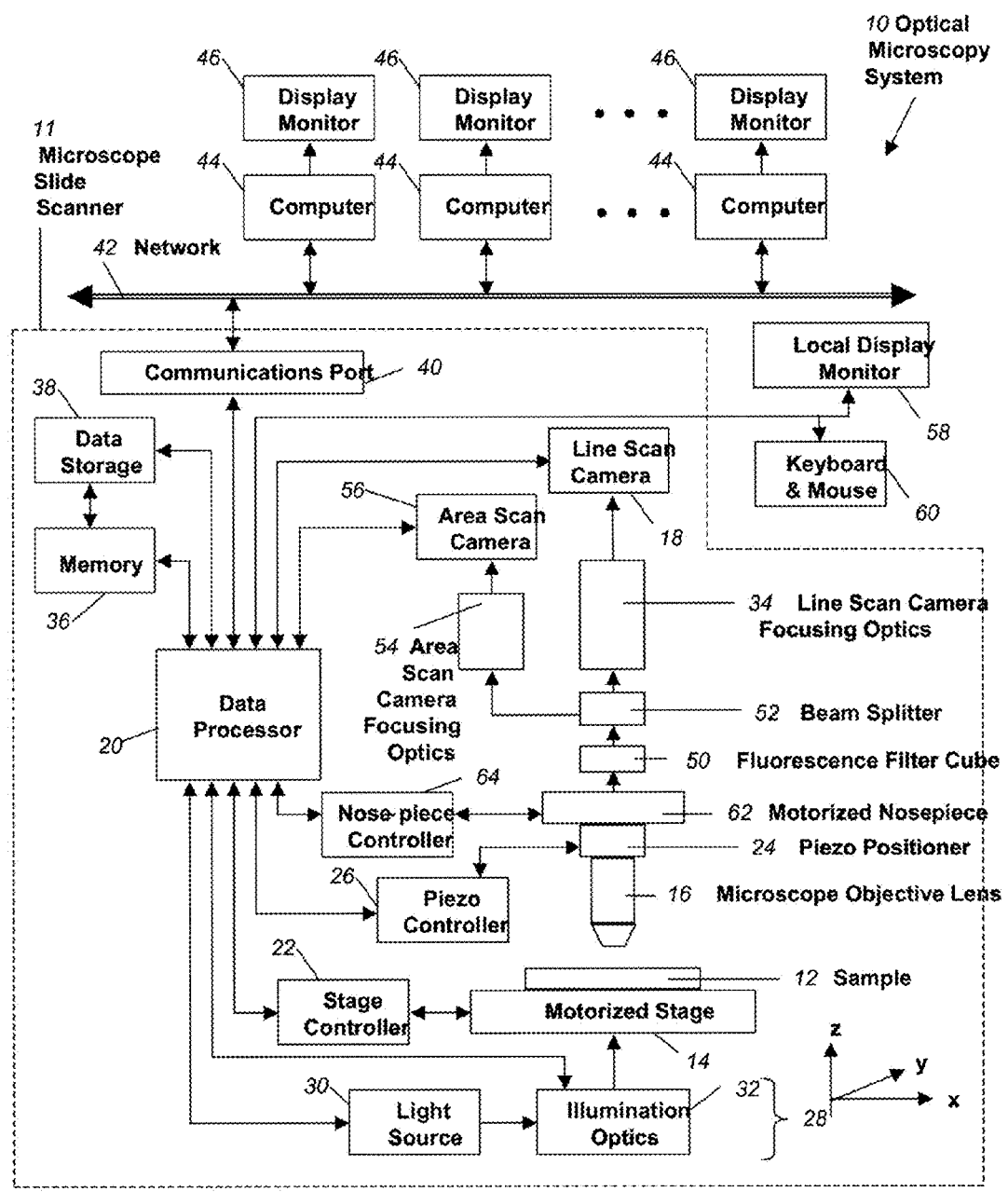
FIG. 5B is a block diagram of a second embodiment of an optical microscopy system according to the present invention.

FIG. 5B illustrates a block diagram of a second embodiment of an optical microscopy system 10 according to the present invention is shown. In this system 10, the scanner 11 is more complex and expensive than the currently preferred embodiment shown in FIG. 1. The additional attributes of the scanner 11 that are shown do not all have to be present for any alternate embodiment to function correctly. FIG. 2 is intended to provide a reasonable example of additional features and capabilities that could be incorporated into the scanner 11.

The alternate embodiment of FIG. 2 provides for a much greater level of automation than the presently preferred embodiment of FIG. 1. A more complete level of automation of the illumination system 28 is achieved by connections between the data processor 20 and both the light source 30 and the illumination optics 32 of the illumination system 28. The connection to the light source 30 may control the voltage, or current, in an open or closed loop fashion, in order to control the intensity of the light source 30. Recall that the light source 30 is a halogen bulb in the presently preferred embodiment. The connection between the data processor 20 and the illumination optics 32 could provide closed loop control of the field iris aperture and the condenser iris to provide a means for ensuring that optimum Köhler illumination is maintained.

Use of the scanner 11 for fluorescence imaging requires easily recognized modifications to the light source 30, the illumination optics 32, and the microscope objective lens 16. The second embodiment of FIG. 2 also provides for a fluorescence filter cube 50 that includes an excitation filter, a dichroic filter, and a barrier filter. The fluorescence filter cube 50 is positioned in the infinity corrected beam path that exists between the microscope objective lens 16 and line scan camera focusing optics 34. One embodiment for fluorescence imaging could include the addition of a filter wheel or tunable filter into the illumination optics 32 to provide appropriate spectral excitation for the variety of fluorescent dyes or nanocrystals available on the market.

The addition of at least one beam splitter 52 into the imaging path allows the optical signal to be split into at least two paths. The primary path is via the line scan camera focusing optics 34, as discussed previously, to enable diffraction-limited imaging by the line scan camera 18. A second path is provided via an area scan camera focusing optics 54 for imaging by an area scan camera 56. It should be readily apparent that proper selection of these two focusing optics can ensure diffraction-limited imaging by the two camera sensors having different pixel sizes. The area scan camera 56 can be one of many types that are currently available, including a simple color video camera, a high performance, cooled, CCD camera, or a variable integration-time fast frame camera. The area scan camera 56 provides a traditional imaging system configuration for the scanner 11. The area scan camera 56 is connected to the data processor 20. If two cameras are used, for example the line scan camera 18 and the area scan camera 56, both camera types could be connected to the data processor using either a single dual-purpose imaging board, two different imaging boards, or the IEEE1394 Firewire interface, in which case one or both imaging boards may not be needed. Other related methods of interfacing imaging sensors to the data processor 20 are also available.

While the primary interface of the scanner 11 to the computer 44 is via the network 42, there may be instances, for example a failure of the network 42, where it is beneficial to be able to connect the scanner 11 directly to a local output device such as a display monitor 58 and to also provide local input devices such as a keyboard and mouse 60 that are connected directly into the data processor 20 of the scanner 11. In this instance, the appropriate driver software and hardware would have to be provided as well.

The second embodiment shown in FIG. 2 also provides for a much greater level of automated imaging performance. Enhanced automation of the imaging of the scanner 11 can be achieved by closing the focus control loop comprising the piezo positioner 24, the piezo controller 26, and the data processor 20 using well-known methods of autofocus. The second embodiment also provides for a motorized nose-piece 62 to accommodate several objectives lenses. The motorized nose-piece 62 is connected to and directed by the data processor 20 through a nose-piece controller 64.

There are other features and capabilities of the scanner 11 which could be incorporated. For example, the process of scanning the sample 12 with respect to the microscope objective lens 16 that is substantially stationary in the x/y plane of the sample 12 could be modified to comprise scanning of the microscope objective lens 16 with respect to a stationary sample 12. Scanning the sample 12, or scanning the microscope objective lens 16, or scanning both the sample 12 and the microscope objective lens 16 simultaneously, are possible embodiments of the scanner 11 which can provide the same large contiguous digital image of the sample 12 as discussed previously.

The scanner 11 also provides a general purpose platform for automating many types of microscope-based analyses. The illumination system 28 could be modified from a traditional halogen lamp or arc-lamp to a laser-based illumination system to permit scanning of the sample 12 with laser excitation. Modifications, including the incorporation of a photomultiplier tube or other non-imaging detector, in addition to or in lieu of the line scan camera 18 or the area scan camera 56, could be used to provide a means of detecting the optical signal resulting from the interaction of the laser energy with the sample 12.

Figure 5C:
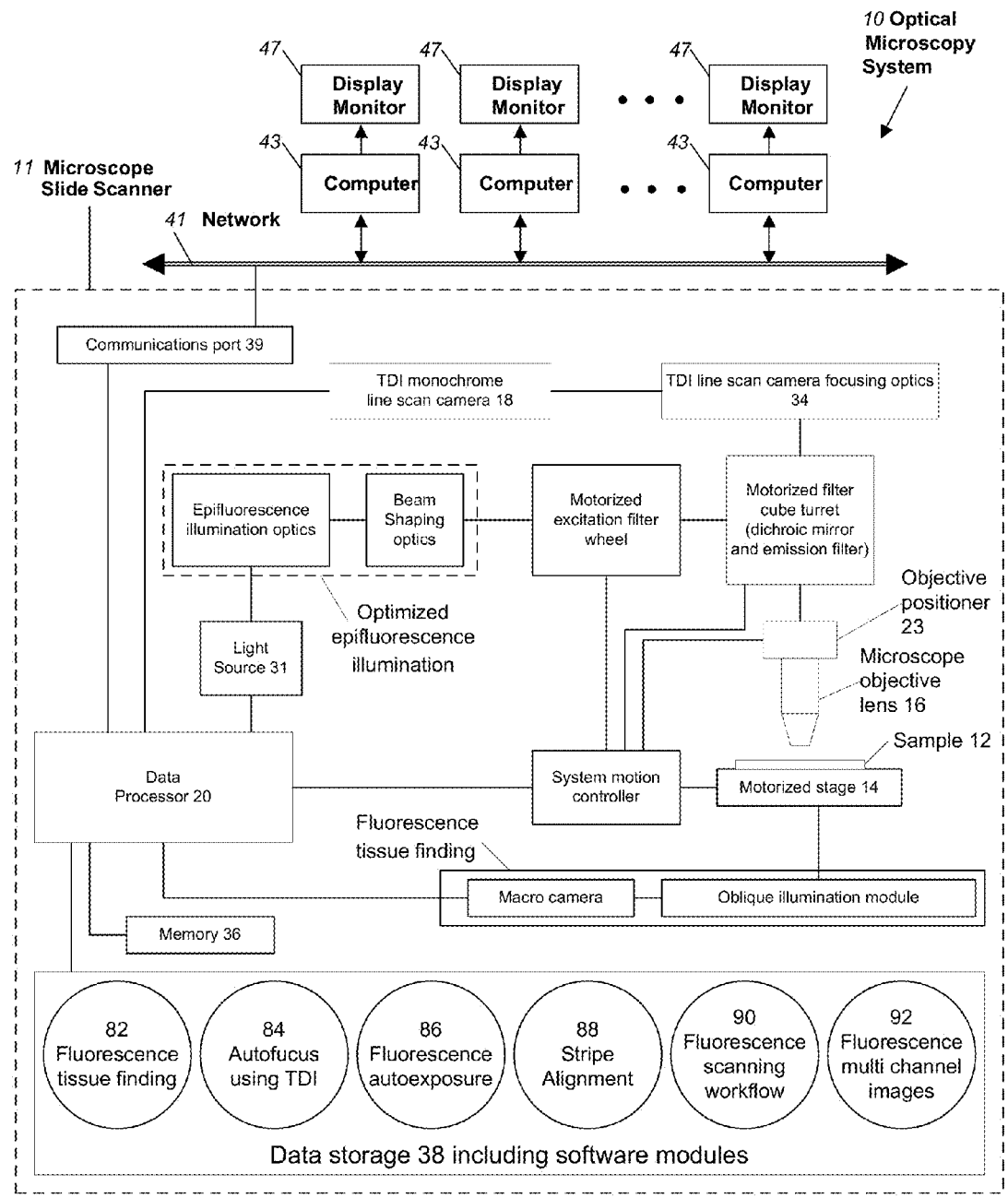
FIG. 5C is a block diagram of a third embodiment of an optical microscopy system according to the present invention.
Figure 6:
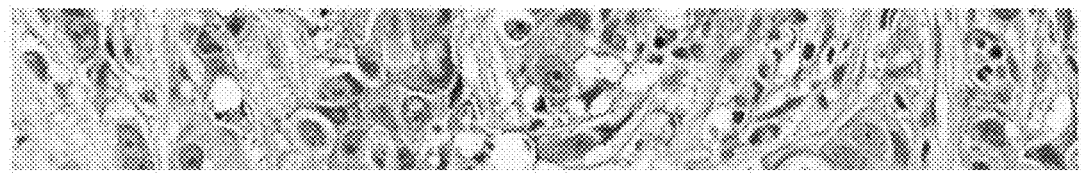
FIG. 6 illustrates an area of interest in a digital slide.

FIG. 5C is a block diagram of a third embodiment of an optical microscopy system 10 according to the present invention. In this system 10, the scanner 11 is optimized for scanning fluorescent microscope samples. The additional attributes of the scanner 11 in this embodiment including the various software and hardware elements do not all have to be present for operation of the fluorescence scanner to function correctly. FIG. 3 illustrates a reasonable example of additional features and capabilities that could be incorporated into the scanner 11 for scanning fluorescent microscope samples.

Figure 13:
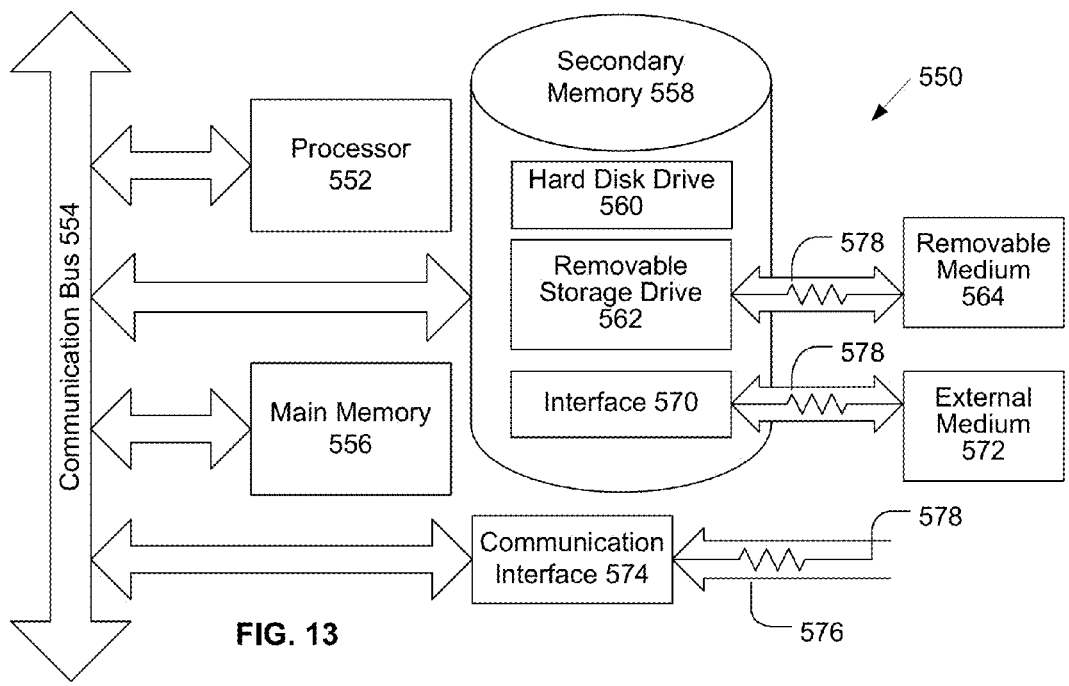
FIG. 13 is a block diagram illustrating an example computer system that may be used in connection with various embodiments described herein.

FIG. 13 is a block diagram illustrating an example computer system 550 that may be used in connection with various embodiments described herein. For example, the computer system 550 may be used in conjunction with the digital pathology system and the computer and display monitors used in conjunction with the viewing software described herein. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method for assessing a quality of a digital slide image, the method comprising using at least one hardware processor to:
    divide a digital slide image into a plurality of image regions;
    for each of at least a subset of two or more of the plurality of image regions,
        determine a spatial frequency of the image region, and
        determine a quality of the image region based on the determined spatial frequency; and
    generate a visual depiction of the digital slide image that, for each of the at least a subset of two or more of the plurality of image regions, indicates the determined quality of the image region.

2. The method of claim 1, further comprising using the at least one hardware processor to, for each of the plurality of image regions, determine whether the image region has qualified content, wherein the at least a subset of two or more of the plurality of image regions comprises only those image regions of the plurality of image regions that have been determined to have qualified content.

3. The method of claim 1, wherein determining a spatial frequency of the image region comprises performing one or more frequency transforms on the image region to determine a score for the image region, and wherein the quality of the image region comprises the score for the image region.

4. The method of claim 3, wherein performing one or more frequency transforms on the image region to determine a score for the image region comprises:
    performing a plurality of partial frequency transforms on the image region to generate a plurality of partial frequency transform values; and
    generating a score for the image region based on one or more of the plurality of partial frequency transform values.

5. The method of claim 4, wherein generating a score for the image region based on one or more of the plurality of partial frequency transform values comprises generating the score for the image region by combining those of the plurality of partial frequency transform values that exceed a threshold value.

6. The method of claim 1, further comprising using the at least one hardware processor to generate a score for the digital slide image based on the determined quality of one or more of the at least a subset of two or more of the plurality of image regions.

7. The method of claim 6, further comprising using the at least one hardware processor to:
    detect artifacts in the digital slide image based on the determined quality of one or more of the at least a subset of two or more of the plurality of image regions; and
    determine a degradation score based on one or more of a magnitude and proportion of detected artifacts;
    wherein the score for the digital slide image is further based on the determined degradation score, and
    wherein the visual depiction of the digital slide image comprises a visual identification of each detected artifact.

8. The method of claim 6, further comprising using the at least one hardware processor to, if the score for the digital slide image is below a threshold value, provide an indication that a slide corresponding to the digital slide image needs to be inspected or rescanned.

9. The method of claim 1, wherein the visual depiction of the digital slide image comprises each of the plurality of image regions with each of the at least a subset of two or more of the plurality of image regions depicted in one of a plurality of colors that corresponds to the determined quality of that image region, wherein each of the plurality of colors represents a different level of quality.

10. A system for assessing a quality of a digital slide image, the system comprising:
    at least one hardware processor; and
    one or more modules that are configured to, when executed by the at least one hardware processor,
        divide a digital slide image into a plurality of image regions,
        for each of at least a subset of two or more of the plurality of image regions, determine a spatial frequency of the image region, and determine a quality of the image region based on the determined spatial frequency, and
        generate a visual depiction of the digital slide image that, for each of the at least a subset of two or more of the plurality of image regions, indicates the determined quality of the image region.

11. The system of claim 10, wherein the one or more modules are further configured to, for each of the plurality of image regions, determine whether the image region has qualified content, wherein the at least a subset of two or more of the plurality of image regions comprises only those image regions of the plurality of image regions that have been determined to have qualified content.

12. The system of claim 10, wherein determining a spatial frequency of the image region comprises performing one or more frequency transforms on the image region to determine a score for the image region, and wherein the quality of the image region comprises the score for the image region.

13. The system of claim 12, wherein performing one or more frequency transforms on the image region to determine a score for the image region comprises:
   performing a plurality of partial frequency transforms on the image region to generate a plurality of partial frequency transform values; and
   generating a score for the image region based on one or more of the plurality of partial frequency transform values.

14. The system of claim 13, wherein generating a score for the image region based on one or more of the plurality of partial frequency transform values comprises generating the score for the image region by combining those of the plurality of partial frequency transform values that exceed a threshold value.

15. The system of claim 10, wherein the one or more modules are further configured to generate a score for the digital slide image based on the determined quality of one or more of the at least a subset of two or more of the plurality of image regions.

16. The system of claim 15, wherein the one or more modules are further configured to:
   detect artifacts in the digital slide image based on the determined quality of one or more of the at least a subset of two or more of the plurality of image regions; and
   determine a degradation score based on one or more of a magnitude and proportion of detected artifacts;
   wherein the score for the digital slide image is further based on the determined degradation score, and
   wherein the visual depiction of the digital slide image comprises a visual identification of each detected artifact.

17. The system of claim 15, wherein the one or more modules are further configured to, if the score for the digital slide image is below a threshold value, provide an indication that a slide corresponding to the digital slide image needs to be inspected or rescanned.

18. The system of claim 10, wherein the visual depiction of the digital slide image comprises each of the plurality of image regions with each of the at least a subset of two or more of the plurality of image regions depicted in one of a plurality of colors that corresponds to the determined quality of that image region, wherein each of the plurality of colors represents a different level of quality.

19. A non-transitory computer-readable medium having one or more sequences of instructions stored thereon, wherein the one or more sequences of instructions are configured to, when executed by at least one hardware processor, cause the at least one hardware processor to:
   divide a digital slide image into a plurality of image regions;
   identify at least a subset of two or more of the plurality of image regions having qualified content;
   for each of the at least a subset of two or more of the plurality of image regions,
      perform a plurality of partial frequency transforms on the image region to generate a plurality of partial frequency transform values, and
      combine those of the plurality of partial frequency transform values that exceed a threshold value to generate a score for the image region;
   generate a score for the digital slide image based on the generated score of one or more of the at least a subset of two or more of the plurality of image regions; and
   generate a visual depiction of the digital slide image that comprises each of the plurality of image regions with each of the at least a subset of two or more of the plurality of image regions depicted in one of a plurality of colors that corresponds to the determined quality of that image region, wherein each of the plurality of colors represents a different level of quality.

20. The non-transitory computer-readable medium of claim 19, wherein the one or more sequences of instructions are further configured to, when executed by at least one hardware processor, cause the at least one hardware processor to:
   detect artifacts in the digital slide image based on the determined quality of one or more of the at least a subset of two or more of the plurality of image regions; and
   determine a degradation score based on one or more of a magnitude and proportion of detected artifacts;
   wherein the score for the digital slide image is further based on the determined degradation score, and
   wherein the visual depiction of the digital slide image further comprises a visual identification of each detected artifact.

* * * * *